(12) United States Patent
Smith et al.

(10) Patent No.: US 8,733,392 B2
(45) Date of Patent: May 27, 2014

(54) BACK PRESSURE REGULATOR

(75) Inventors: Alan Smith, Staffordshire (GB); Nigel Charles Wood, Staffordshire (GB)

(73) Assignee: Finishing Brands UK Limited, Dorset (GB)

( * ) Notice: Subject to any disclaimer, the term of this patent is extended or adjusted under 35 U.S.C. 154(b) by 529 days.

(21) Appl. No.: 12/064,853

(22) PCT Filed: Sep. 12, 2006

(86) PCT No.: PCT/IB2006/002503
§ 371 (c)(1),
(2), (4) Date: Feb. 26, 2008

(87) PCT Pub. No.: WO2007/029094
PCT Pub. Date: Mar. 15, 2007

(65) Prior Publication Data
US 2008/0230128 A1 Sep. 25, 2008

(30) Foreign Application Priority Data

Sep. 13, 2005 (GB) .................................. 0518637.4

(51) Int. Cl.
*F16K 31/365* (2006.01)
*B05B 12/08* (2006.01)
*B05B 15/12* (2006.01)

(52) U.S. Cl.
CPC ........... *B05B 12/088* (2013.01); *B05B 15/1225* (2013.01)
USPC ................. 137/505.41; 137/505.42; 251/61.2

(58) Field of Classification Search
USPC ............... 137/529, 510, 495, 505.41, 505.42; 251/331, 61.5, 61.1, 61.2
See application file for complete search history.

(56) References Cited

U.S. PATENT DOCUMENTS

| 2,244,686 | A | | 6/1941 | Garrison et al. | |
|---|---|---|---|---|---|
| 3,169,402 | A | * | 2/1965 | Baker | 73/716 |
| 3,175,473 | A | * | 3/1965 | Boteler et al. | 92/128 |
| 3,286,977 | A | * | 11/1966 | Miottel | 251/46 |
| 3,720,373 | A | | 3/1973 | Levey | |
| 3,730,773 | A | | 5/1973 | Graber | |
| 3,816,025 | A | | 6/1974 | O'Neill | |

(Continued)

FOREIGN PATENT DOCUMENTS

| EP | 0347607 A2 | 12/1989 |
|---|---|---|
| EP | 0842706 A2 | 5/1998 |

(Continued)

OTHER PUBLICATIONS

International Search Report for PCT/IB2006/002503 mailed Feb. 27, 2007.

(Continued)

*Primary Examiner* — Kevin Lee
*Assistant Examiner* — P. Macade Nichols
(74) *Attorney, Agent, or Firm* — Fletcher Yoder, P.C.

(57) ABSTRACT

A paint circulating system back pressure regulator comprises a flow passage for paint, at least part of which is disposed between a fixed structure and a moveable surface which is moveable to vary the width of the flow passage so as to regulate a pressure of paint upstream of the regulator. The regulator is also provided with a chamber having an opening for communicating with a supply of a pressurized fluid for controlling operation of the regulator.

18 Claims, 4 Drawing Sheets

(56) References Cited

U.S. PATENT DOCUMENTS

| | | | |
|---|---|---|---|
| 3,939,855 A | 2/1976 | Wiggins | |
| 3,958,724 A | 5/1976 | Ordway | |
| 3,981,320 A | 9/1976 | Wiggins | |
| 4,005,825 A | 2/1977 | Schowiak | |
| 4,009,971 A | 3/1977 | Krohn et al. | |
| 4,019,653 A | 4/1977 | Scherere et al. | |
| 4,062,220 A | 12/1977 | Taube et al. | |
| 4,085,892 A | 4/1978 | Dalton | |
| 4,116,259 A | 9/1978 | Koskimies et al. | |
| 4,215,721 A | 8/1980 | Hetherington et al. | |
| 4,231,382 A | 11/1980 | Beerens | |
| 4,231,392 A | 11/1980 | Allibert | |
| 4,232,055 A | 11/1980 | Shaffer | |
| 4,252,476 A * | 2/1981 | Koppers et al. | 405/290 |
| 4,265,858 A | 5/1981 | Crum et al. | |
| 4,281,683 A | 8/1981 | Hetherington et al. | |
| 4,295,489 A | 10/1981 | Arends et al. | |
| 4,311,724 A | 1/1982 | Scharfenberger | |
| 4,313,475 A | 2/1982 | Wiggins | |
| 4,337,282 A | 6/1982 | Springer | |
| 4,348,425 A | 9/1982 | Scharfenberger | |
| 4,350,720 A | 9/1982 | Scharfenberger | |
| 4,375,865 A | 3/1983 | Springer | |
| 4,376,523 A | 3/1983 | Goyen | |
| 4,380,321 A | 4/1983 | Culbertson et al. | |
| 4,390,126 A | 6/1983 | Buchholz et al. | |
| 4,397,610 A | 8/1983 | Krohn | |
| 4,487,367 A | 12/1984 | Perry et al. | |
| 4,497,341 A | 2/1985 | Wright | |
| 4,509,684 A | 4/1985 | Schowiak | |
| 4,516,601 A * | 5/1985 | Chanal et al. | 137/510 |
| 4,545,401 A | 10/1985 | Karpis | |
| 4,549,572 A | 10/1985 | Wright | |
| 4,569,480 A | 2/1986 | Levey | |
| RE32,151 E | 5/1986 | Scharfenberger | |
| 4,592,305 A | 6/1986 | Scharfenberger | |
| 4,593,360 A | 6/1986 | Cocks | |
| 4,627,465 A | 12/1986 | Kolibas et al. | |
| 4,653,532 A | 3/1987 | Powers | |
| 4,657,047 A | 4/1987 | Kolibas | |
| 4,660,771 A | 4/1987 | Chabert et al. | |
| 4,700,896 A | 10/1987 | Takeuchi et al. | |
| 4,706,885 A | 11/1987 | Morin | |
| 4,714,179 A | 12/1987 | Otterstetter et al. | |
| 4,728,034 A | 3/1988 | Matsumura et al. | |
| 4,750,523 A | 6/1988 | Crouse | |
| 4,776,368 A | 10/1988 | Drozd | |
| 4,785,760 A | 11/1988 | Tholome | |
| 4,792,092 A | 12/1988 | Elberson et al. | |
| 4,813,603 A | 3/1989 | Takeuchi et al. | |
| 4,828,218 A * | 5/1989 | Medlock | 251/26 |
| 4,830,055 A | 5/1989 | Kolibas | |
| 4,844,706 A | 7/1989 | Katsuyama et al. | |
| 4,846,226 A | 7/1989 | Merritt | |
| 4,878,622 A | 11/1989 | Jamison et al. | |
| 4,881,563 A | 11/1989 | Christian | |
| 4,884,752 A | 12/1989 | Plummer | |
| 4,902,352 A | 2/1990 | Christian | |
| 4,909,180 A | 3/1990 | Oishi et al. | |
| 4,915,599 A | 4/1990 | Katsuyama et al. | |
| 4,917,296 A | 4/1990 | Konieczynski | |
| 4,928,883 A | 5/1990 | Weinstein | |
| 4,936,340 A | 6/1990 | Potter et al. | |
| 4,936,507 A | 6/1990 | Weinstein | |
| 4,936,509 A | 6/1990 | Weinstein | |
| 4,936,510 A | 6/1990 | Weinstein | |
| 4,957,060 A | 9/1990 | Cann | |
| 4,962,724 A | 10/1990 | Prus et al. | |
| 4,982,903 A | 1/1991 | Jamison et al. | |
| 4,993,353 A | 2/1991 | Ogasawara et al. | |
| 5,014,645 A | 5/1991 | Cann et al. | |
| 5,033,942 A | 7/1991 | Petersen | |
| 5,058,805 A | 10/1991 | Anderson et al. | |
| 5,058,812 A | 10/1991 | Cox et al. | |
| 5,064,680 A | 11/1991 | Cann et al. | |
| 5,072,881 A | 12/1991 | Taube, III | |
| 5,074,237 A | 12/1991 | Ogasawara | |
| 5,094,596 A | 3/1992 | Erwin et al. | |
| 5,096,120 A | 3/1992 | Luckarz | |
| 5,096,126 A | 3/1992 | Giroux et al. | |
| 5,100,057 A | 3/1992 | Wacker et al. | |
| 5,102,045 A | 4/1992 | Diana | |
| 5,102,046 A | 4/1992 | Diana | |
| 5,146,950 A | 9/1992 | Rodgers et al. | |
| 5,152,466 A | 10/1992 | Matushita et al. | |
| 5,154,357 A | 10/1992 | Jamison et al. | |
| 5,171,613 A | 12/1992 | Bok et al. | |
| 5,192,595 A | 3/1993 | Akeel et al. | |
| 5,193,750 A | 3/1993 | LaMontagne et al. | |
| 5,195,680 A | 3/1993 | Holt | |
| 5,196,067 A | 3/1993 | Lacchia | |
| 5,197,676 A | 3/1993 | Konieczynski et al. | |
| 5,199,650 A | 4/1993 | Ishibashi et al. | |
| 5,205,488 A | 4/1993 | Heusser | |
| 5,220,259 A | 6/1993 | Werner et al. | |
| 5,221,047 A | 6/1993 | Akeel et al. | |
| 5,223,306 A | 6/1993 | Bartow | |
| 5,228,842 A | 7/1993 | Guebeli et al. | |
| 5,249,748 A | 10/1993 | Lacchia et al. | |
| 5,255,856 A | 10/1993 | Ishibashi et al. | |
| 5,269,567 A | 12/1993 | Kubota et al. | |
| 5,271,569 A | 12/1993 | Konieczynski et al. | |
| 5,306,350 A | 4/1994 | Hoy et al. | |
| 5,309,403 A | 5/1994 | Bartow | |
| 5,328,093 A | 7/1994 | Feitel | |
| 5,336,063 A | 8/1994 | Lehrke et al. | |
| 5,397,063 A | 3/1995 | Weinstein | |
| 5,411,210 A | 5/1995 | Gimple et al. | |
| 5,413,283 A | 5/1995 | Gimple et al. | |
| 5,433,587 A | 7/1995 | Bankert et al. | |
| 5,460,297 A | 10/1995 | Shannon et al. | |
| 5,485,941 A | 1/1996 | Guyomard et al. | |
| 5,549,755 A | 8/1996 | Milovich et al. | |
| 5,632,816 A | 5/1997 | Allen et al. | |
| 5,632,822 A | 5/1997 | Knipe, Jr. et al. | |
| 5,676,756 A | 10/1997 | Murate et al. | |
| 5,701,922 A | 12/1997 | Knipe, Jr. et al. | |
| 5,725,150 A | 3/1998 | Allen et al. | |
| 5,725,358 A | 3/1998 | Bert et al. | |
| 5,746,831 A | 5/1998 | Allen et al. | |
| 5,787,928 A | 8/1998 | Allen et al. | |
| 5,853,027 A | 12/1998 | Winkel et al. | |
| 5,854,190 A | 12/1998 | Knipe, Jr. et al. | |
| 5,863,352 A | 1/1999 | Gonda | |
| 5,865,380 A | 2/1999 | Kazama et al. | |
| 5,944,045 A | 8/1999 | Allen et al. | |
| 6,056,008 A | 5/2000 | Adams et al. | |
| 6,077,354 A | 6/2000 | Kaneski et al. | |
| 6,154,355 A | 11/2000 | Altenburger et al. | |
| 6,168,824 B1 | 1/2001 | Barlow et al. | |
| 6,305,419 B1 | 10/2001 | Krieger et al. | |
| 6,382,220 B1 | 5/2002 | Kefauver | |
| 6,423,143 B1 | 7/2002 | Allen et al. | |
| 6,533,488 B2 | 3/2003 | Blenkush et al. | |
| 6,612,345 B1 | 9/2003 | Hosoda et al. | |
| 6,619,563 B2 | 9/2003 | Van der Steur | |
| 6,627,266 B2 | 9/2003 | Dion | |
| 6,712,021 B2 | 3/2004 | Pollock | |
| 6,712,906 B2 | 3/2004 | Estelle et al. | |
| 6,722,257 B2 | 4/2004 | Yoh et al. | |
| 6,755,913 B1 | 6/2004 | Kobayashi et al. | |
| 6,821,096 B2 | 11/2004 | Kosmyna et al. | |
| 6,976,072 B2 | 12/2005 | Mathieson | |
| 7,026,365 B2 | 4/2006 | Lee et al. | |
| 2003/0101931 A1 | 6/2003 | Estelle et al. | |
| 2004/0001765 A1 | 1/2004 | Wood | |
| 2004/0030428 A1 | 2/2004 | Crampton et al. | |
| 2004/0056045 A1 | 3/2004 | Kosmyna et al. | |
| 2004/0154532 A1 | 8/2004 | Ramsay | |
| 2005/0152789 A1 | 7/2005 | IKapron | |
| 2006/0177565 A1 | 8/2006 | Bhattacharya et al. | |
| 2006/0193731 A1 | 8/2006 | Lindzion et al. | |

(56) References Cited

U.S. PATENT DOCUMENTS

| | | |
|---|---|---|
| 2007/0075163 A1 | 4/2007 | Smith et al. |
| 2007/0122555 A1 | 5/2007 | Jones |
| 2007/0207260 A1 | 9/2007 | Collmer et al. |

FOREIGN PATENT DOCUMENTS

| | | |
|---|---|---|
| EP | 1830966 | 5/2008 |
| FR | 2656348 | 6/1991 |
| GB | 1155328 | 6/1969 |
| JP | 2005285436 | 2/1993 |
| JP | 2000346233 | 12/2000 |
| JP | 2008012406 | 1/2008 |
| TW | 520315 | 2/2003 |
| TW | 570841 | 1/2004 |
| WO | WO2005061889 | 7/2005 |
| WO | WO2005075793 | 8/2005 |
| WO | WO2007029094 | 3/2007 |
| WO | WO2007031841 | 3/2007 |
| WO | WO2007032827 | 3/2007 |

OTHER PUBLICATIONS

Xu and Koelling, "Development of a Closed Loop Paint Circulation System for Non-Newtonian Waterbone Coatings", 2006 SAE World Congress Apr. 3-6, 2006, Detroit Michigan.

* cited by examiner

BACK PRESSURE REGULATOR

RELATED APPLICATIONS

The present application is based on International Application No. PCT/IB2006/002503 filed Sep. 12, 2006, and claims priority from British Application Number 0518637.4 filed Sep. 13, 2005, the disclosures of which are hereby incorporated by reference herein in their entirety.

TECHNICAL FIELD

This invention relates to a back pressure regulator (BPR) for use in a paint circulating system.

BACKGROUND ART

Traditional paint spray systems, of the type employed in car manufacturing, may consist of several (say 30) separate paint lines, each providing a different coloured paint to the spray booth. In general, only one colour is sprayed at any one time so only one line is actively employed at any instance. However, even when not being sprayed, it is necessary to circulate the paint in each line through the system at a minimum velocity to prevent the pigments from separating from the carrier fluid.

To ensure that the paint is at the required pressure for spraying, a BPR is used in combination with the paint pump to regulate and maintain the required fluid back pressure at the spray booth. In traditional systems, the BPR is adjusted manually and uses a coil spring, which is used to maintain the paint pressure upstream of the regulator by controlling the fluid flow rate. Also, in many systems (such as those employing certain types of turbine or lobe pumps) the pump will be set to operate at a fixed pressure and flow rate and the BPR used to maintain the set pressure. In this type of system, the BPR controls system pressure by adjusting flow rate to compensate for variations in the amount of fluid used at the paint 'take offs'. Thus, each line is usually operated at the flow conditions required for spraying, whether the paint is being used or merely circulated. This is extremely inefficient and results in a large waste of energy. For example, a system operating 24 hours a day may only be required to spray each individual colour for, say, 1 hour a day. Each pump would be operated at the pressure and flow rate required to meet the system requirement for 24 hours a day even though the paint is only required to operate at that pressure for 1 hour a day.

In addition, a pump that is required to operate at a higher speed and pressure for a longer period of time is likely to require maintenance in a much shorter period of time than one that is used more conservatively.

It is an object of the present invention to provide an improved BPR for use in a paint circulation system, which alleviates the aforementioned problems.

DISCLOSURE OF INVENTION

In accordance with the present invention there is provided a paint circulating system back pressure regulator comprising a flow passage for paint, at least part of which is disposed between a fixed structure and a moveable surface which is moveable to vary the width of the flow passage so as to regulate a pressure of paint upstream of the regulator; and a chamber having an opening for communicating with a supply of a pressurised fluid for controlling operation of the regulator.

Conveniently, the moveable surface is a surface of a flexible membrane. The pressurised fluid may be compressed air.

It is an advantage that operation of the regulator can be remotely controlled to suit operational requirements. As such, the back pressure regulator can easily perform in different modes depending on whether the paint is being used or merely being circulated. This means the system can be operated more efficiently and energy can be conserved. In addition, individual components in the system will suffer less wear and should last longer.

It is therefore convenient that the regulator can be remotely adjusted to supply line pressure when the paint is required for use at the spray booth and to reduce line pressure when the paint is not required at the spray booth.

It is also desirable that the size of the flow passage is automatically adjusted to maintain a desired system pressure.

The pressure of the pressurised fluid supplied to the system may be varied to control the restriction or flow of paint through the flow passage. Two or more air chambers may be employed to provide a cumulative effect.

In a particular embodiment, the pressurised fluid may be supplied to increase the pressure applied by the moveable surface of the BPR, thereby requiring the paint in the system to increase in pressure before flowing through the BPR. This is achieved by utilizing the pressurised fluid to push down on the moveable surface and thereby constrict the flow passage. This mode of operation is required when the paint is in use and some paint is being taken from the system. When the paint is not in use and none is being taken out of the system, un-pressurised flow can be achieved by switching off or reducing the pressure of the pressurised fluid supply.

In another embodiment of the BPR a resilient biasing means is provided to set the required back pressure and the pressurised fluid utilized to relieve (i.e. to counteract) the biasing effect. The biasing means may be employed in this system to limit the flow passage when the pressurised fluid is not supplied. The biasing means may be a coiled spring and is, conveniently, of adjustable strength.

Thus, when paint is being used, the pressurised fluid (e.g. compressed air) supply can be switched off or reduced to allow the spring to pressurise the paint system. The pressurised fluid (e.g. compressed air) can be supplied to decrease the pressure applied by the spring and thereby de-pressurise the paint in the system. This may be achieved by utilizing the compressed air to push upwards against a downwardly biased spring so as to open the flow passage.

An advantage of this embodiment is that the BPR will still operate to ensure the paint is at the required system pressure even if the pressurised fluid (e.g. compressed air) supply fails. Thus, the paint will always be pressurised for use and so no loss in fluid system pressure will occur at the spray booth.

BRIEF DESCRIPTION OF THE DRAWINGS

Particular embodiments of the invention are illustrated in the accompanying drawings wherein.

DETAILED DESCRIPTION OF THE INVENTION

Figure 1:
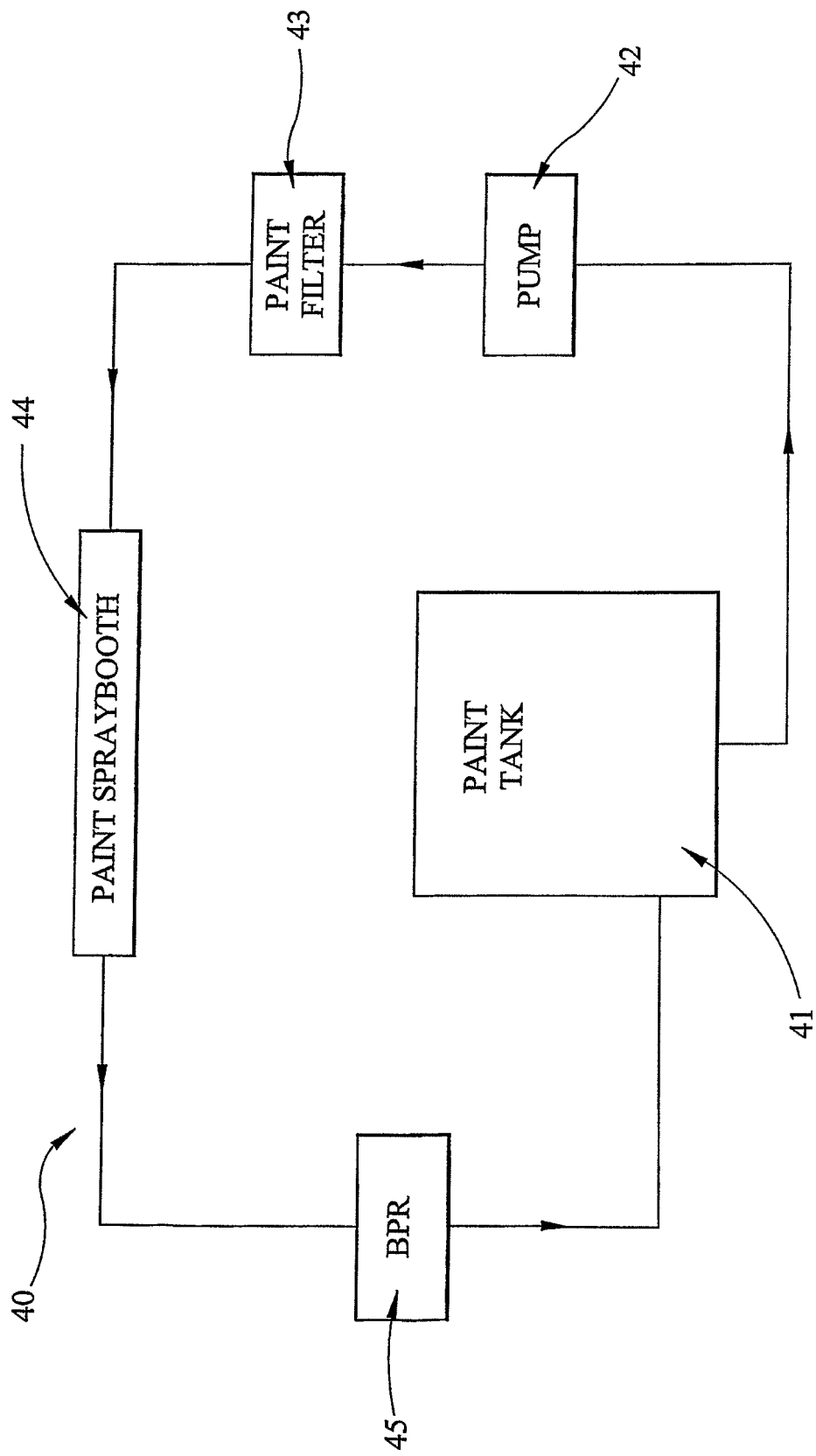
FIG. 1 is a schematic representation of a paint circulation system employing a BPR.

Referring to the drawings, a paint circulation system 40 employing a BPR 45 is shown in FIG. 1. Thus, a pump 42 is operable to supply paint from a paint tank 41 through a paint filter 43 and into a spray booth 44. Any unused paint is then recycled and returned to the paint tank 41 via a BPR 45.

In this set-up, the BPR 45 is employed to control the upstream pressure in the system at the desired level, typically 5 to 10 bar when the paint is in use.

Figure 2:
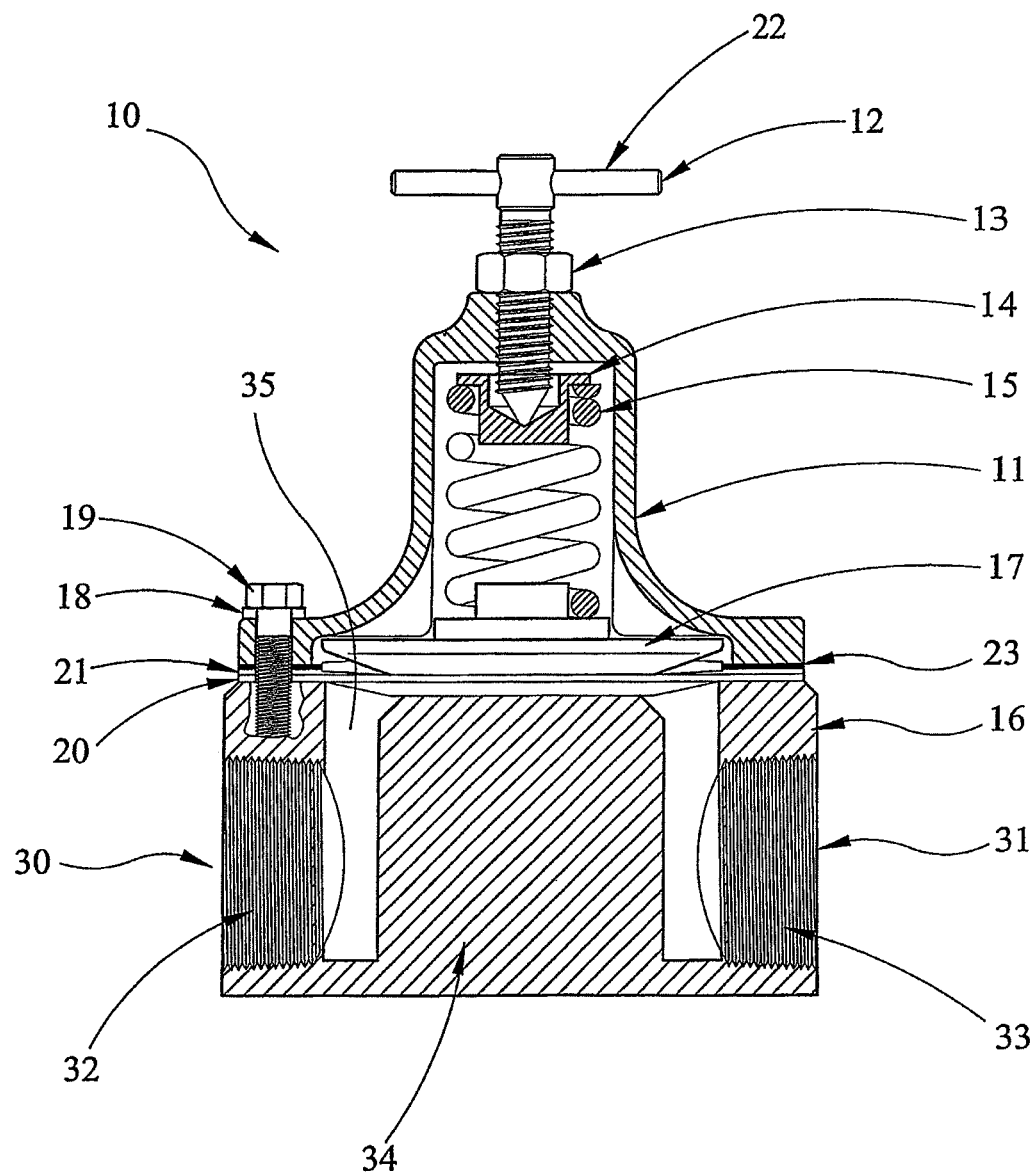
FIG. 2 is a cross-sectional view of a traditional BPR known from the prior art.

A prior art back pressure regulator (BPR) 10, for use in a paint circulation system 40, is shown in FIG. 2. This comprises a body portion 16 with an inlet path 30 and an outlet path 31, with respective screw thread couplings 32 and 33 for attachment to respective conduits used in the paint circulation system 40. A structure 34 is disposed between said inlet path 30 and said outlet path 31 to create a constricted flow path 35 there between. A flexible diaphragm 20 is provided to vary the size of the constricted flow path 35 by varying its distance from the structure 34. In the particular example shown, a further diaphragm 21 is juxtaposed with the inner diaphragm 20. A bell-shaped upper casing or bonnet 11 is flange mounted on top of body 16, trapping the outer rims of the diaphragms 20 and 21 together with a gasket 23 to form a seal. The assembly is held together by means of screwed fasteners 19. A disc 17 is positioned within the lower end of bell 11, above diaphragms 20 and 21. The bell 11 encloses a helical spring 15. The lower end of the spring 15 bears against a location on the top surface of the disc 17. A button 14 bears against the top end of the spring 15. An adjusting screw 12, located in a threaded hole through the top of the bell 11, bears against the button 14. The head of the screw 12 protruding from the top of bell 11 is provided with a handle 22. A locknut 13 is provided between the head of the screw 12 and the top of bell 11 such that unscrewing the locknut 13 allows the screw 12 to be turned to vary its relative position with respect to bell 11. Once the screw 12 is in its desired location, the locknut 13 can be tightened to hold the screw 12 in position.

As can be seen from FIG. 2, tightening the screw 12 forces the button 14 down onto the spring 15 to compress it. In turn, the spring 15 will force the disc 17 downwardly and into contact with the diaphragms 21 and 20. If the spring force is large enough, the lower diaphragm 20 may be forced into contact with structure 34 to completely seal the flow path 35. Loosening the screw 12 will have the opposite effect and will open the flow path 35.

In operation, paint will flow into the BPR 10 via the inlet path 30. The spring 15 will be set to apply a desired pressure on the diaphragm 20. Thus, the pressure of incoming paint trying to pass through the BPR 10 will act on the diaphragm 20 against the force of the spring 15. If the incoming paint pressure is greater than the pressure from the spring 15, it will force diaphragm 20 away from the structure 34 thereby creating a wider flow path 35 to relieve the pressure. If the incoming paint pressure drops, the pressure from the spring 15 will become more dominant and will force the diaphragm 20 towards the structure 34 thereby creating a narrower flow path 35. In this way the BPR will continue to iron out the effects of pressure fluctuations in the system. The result of which is that the paint pressure upstream of the BPR 10 is kept relatively constant. This is particularly desirable when the line is in use as some paint will be taken out of the system, tending to reduce the paint flow and/or pressure of paint circulating around the system. However, as described above the BPR 10 will automatically compensate for this loss by reducing the flow to maintain the desired pressure in the system.

The main problem with this type of BPR 10 is unnecessary use of energy to pressurise paint upstream of the BPR 10 when it is not required for spraying. Pumping paint at this high pressure level also wears out the pump more quickly than if it is used more economically.

Figure 3:
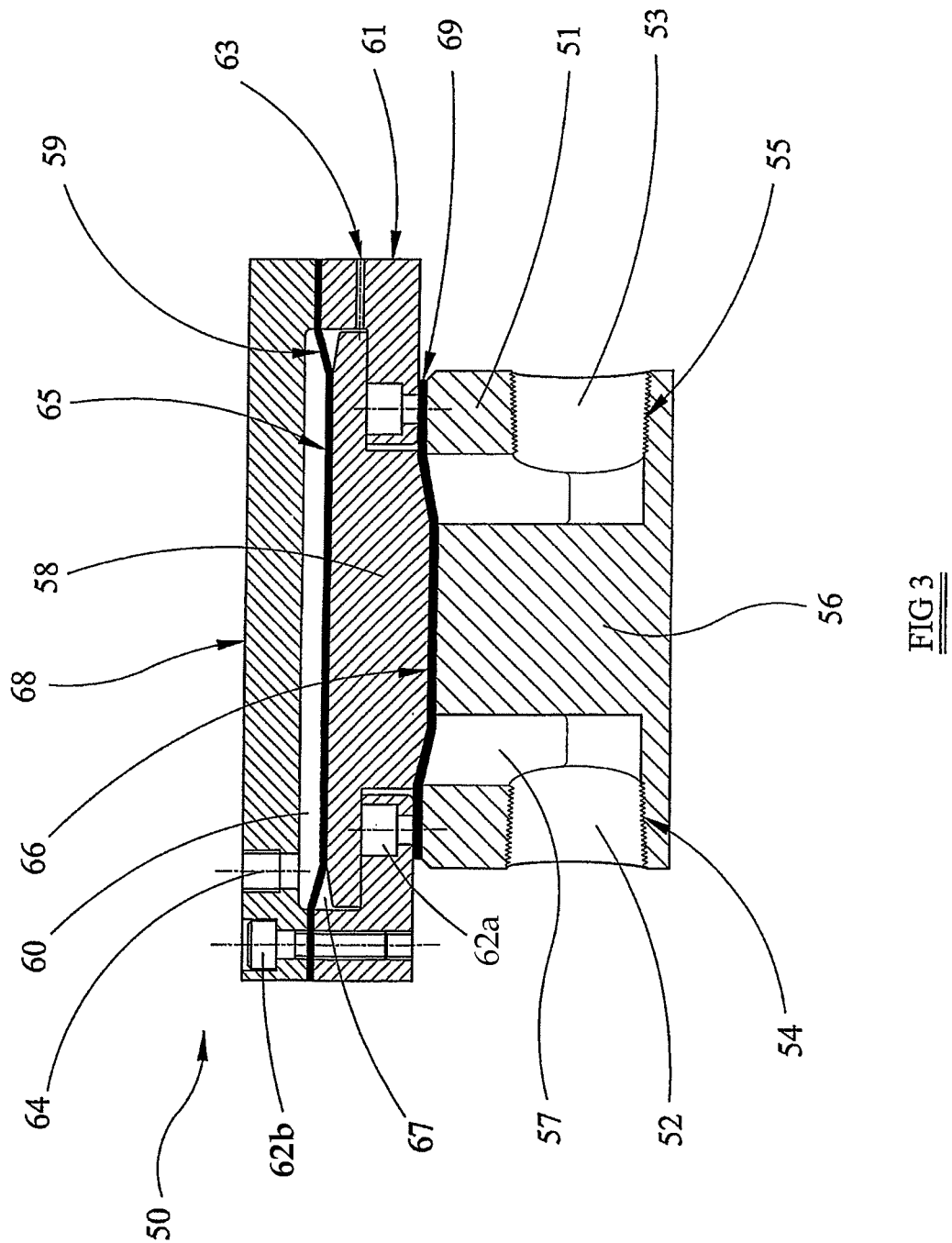
FIG. 3 is a cross-sectional view of a BPR according to the present invention.

An example of a particular BPR 50, according to the present invention, is shown in FIG. 3. This comprises a valve body 51 having an inlet port 52 and an outlet port 53, with respective screw thread couplings 54 and 55 for attachment to respective conduits used in a paint circulation system such as that of FIG. 1. A structure 56 is disposed between the inlet port 52 and the outlet port 53. A first diaphragm 69 extends across the valve body 51 over an upper surface of the structure 56. In the position shown, the first diaphragm 69 is in contact with the upper surface of the structure 56. In this position a flow path 57 for paint from the inlet port 52 to the outlet port 53 is blocked. However, the first diaphragm 69 is flexible so that (as will be described in more detail below) it can lift clear of the structure 56 to provide a variable restriction to paint flow.

A vertically moveable member or diaphragm plate 58 is disposed above the first diaphragm 69. A second diaphragm 59 is positioned above the moveable member 58. An air chamber 60 is provided between the opposite side of the diaphragm 59 and a chamber cap 68. A housing 61, containing the member 58 and the air chamber 60, is fastened by means of a threaded fastener arrangement 62a to the valve body 51, trapping the outer regions of the first diaphragm 69 to provide a seal and prevent any paint loss. The second diaphragm 59 is similarly trapped between an outer rim of the chamber cap 68 and the housing 61 by means of fasteners 62b. The moveable member 58 can move vertically within a clearance cavity 67 in the housing 61. An air vent 63 is also provided in the housing 61 to allow ambient air surrounding the member 58 to flow into and out of the cavity 67 as the member 58 moves. The second diaphragm 59 provides a seal between the air chamber 60 and the cavity 67. An air inlet 64 is provided in the air chamber cap 68 for attachment to a compressed air supply.

Vertical movement of the member 58, together with flexing of the first and second diaphragms 169, 159, varies the size of the flow path 57. When no pressurized air is supplied to the chamber 60, the member 58 will be free to move up and down with the housing 61. Thus, the pressure of paint entering the BPR 50 will act on the first diaphragm 69 to force the member 58 away from the structure 56 with very little resistance. This opens up the flow passage 57 between the first diaphragm 69 and the structure 56, resulting in only a small pressure drop across the BPR 50.

When the force supplied by the compressed air in the chamber 60 becomes large enough, the second diaphragm 59 will flex downwardly and force the moveable member 58 into contact with the first diaphragm 69 and towards the structure 56, thereby constricting the flow path 57. If the difference between the air pressure and the paint pressure is large enough the first diaphragm 69 may be forced into contact with the structure 56 to completely seal the flow path 57.

In operation, paint will flow into the BPR 50 via the inlet path 52. The air pressure in the chamber 60 will be set to apply the desired force on the moveable member 58, to regulate the pressure of paint upstream of the BPR 50. Thus, if the incoming paint pressure increases, it will force the first diaphragm 69 and the moveable member 58 away from structure 56 thereby creating a wider flow path 57. This allows more paint to flow through the BPR 50, thereby relieving the upstream pressure to bring it back to the set point. If the incoming paint pressure drops, the air pressure acting on the second diaphragm 59 and the moveable member 58 will force them towards the structure 56, creating a narrower flow path 57, restricting paint flow through the BPR 50 and increasing the upstream pressure to bring it back to the set point. Thus, the BPR 50 will perform the same function as BPR 10 under these conditions, and the pressure of paint upstream of the BPR 50 will be kept nearly constant.

For the BPR 50, the applied air pressure to the chamber 60 determines the pressure of paint in the system. Accordingly, the system paint pressure can be varied by simply varying the air pressure supplied to chamber 60. This can be done remotely by control of the air supply.

In the arrangement shown in FIG. 3, the second diaphragm 59 has a relatively large surface area 65 facing the air chamber 60, when compared to the lower surface area 66 of the first diaphragm 69 facing the paint flowing through the constricted flow path 57. This allows for an efficient transfer of energy as a relatively small air pressure applied to the large surface 65, via diaphragm 59, can create a more concentrated and therefore larger pressure force through the lower surface 66. In a particular example, an air pressure of 6 bar will result in a pressure of 15 bar on the lower surface 66.

The applied air pressure in this embodiment can be considered to perform essentially the same function as the spring 15 shown in FIG. 2. However, the major advantage with the present BPR 50 is that when the paint is not in use, the air pressure can be switched off to allow paint to circulate relatively freely. In this instance, there is no need to maintain a high paint pressure in the system because the paint is not being used. Compared with systems in which the BPR pressure is set manually, regardless of whether the paint is in use or not, the BPR 50 results in less wear in the pump and in the system in general, and much less energy to pump the paint around.

The system operation may be controlled and monitored via a computer or network. Thus, operation of the pump 42 can be controlled and transducers used to monitor pressures from a remote location. The present system also allows operation of the BPR 50 to be controlled remotely by a computer.

Figure 4:
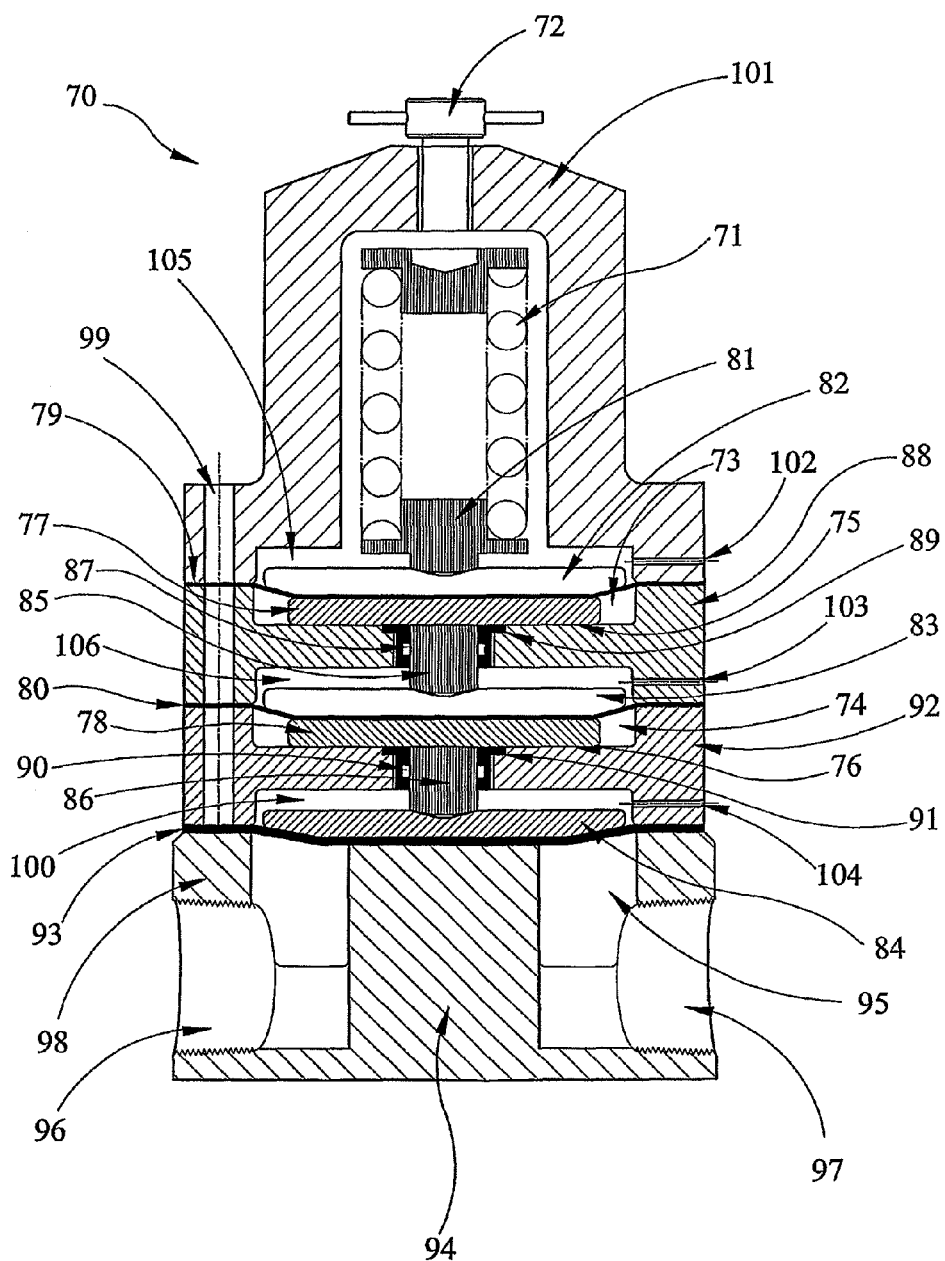
FIG. 4 is a cross-sectional view of another BPR according to the present invention.

A further embodiment of the present invention is shown in FIG. 4. This BPR 70 combines the use of compressed air with a spring 71. The spring 71 provides for a constant downward force determined by the setting of a screw 72, as per the BPR 10 of FIG. 2. In this example, two compressed air chambers, an upper chamber 73 and a lower chamber 74, are provided for cumulative effect. Each chamber includes a respective moveable member 77, 78. Each moveable member 77, 78 has a respective lower surface 75, 76 and is attached to a respective diaphragm 79, 80, which defines the upper wall of the respective chamber 73, 74. The diaphragms 79, 80 are sandwiched between the moveable members 77, 78 and respective plates 82, 83. The spring 71 provides a downwards force on a first post 81 pushing against the plate 82 on top of the diaphragm 79 and down onto the moveable member 77 in the upper chamber 73. The moveable member 77 bears against the top of a second post 85, which extends downwardly through a channel 87 in the housing 88. The channel 87 is provided with a seal 89 to allow the second post 85 to move vertically, but prevent air within the chamber 73 from escaping. This arrangement is repeated by way of the moveable member 78 in the lower chamber 74 and a third post 86, channel 90 and seal 91. The third post 86 bears against an element 84 on top of a main diaphragm 93. The BPR 70 further includes an inlet 96, an outlet 97 and a structure 94, which defines a flow path for paint underneath the main diaphragm 93, in the same manner as the embodiment of FIG. 3.

Air supply inlets (not shown) are provided to connect the chambers 73 and 74 to an air supply. Air pressure supplied to the two chambers 73, 74 acts on the two surfaces 75 and 76, to create a large total surface area as an alternative to the single, wide surface area 65 of the embodiment in FIG. 3. This allows for a more compact device.

As can be seen, air pressure in this BPR 70 is employed to act against the downward force from the spring 71. This is because air pressure applied to chambers 73 and 74 acts on the lower surfaces 75 and 76 of the moveable members 77 and 78. In this way, supplied air pressure can be used to override the spring 71 to open up the flow path and allow paint to flow through the BPR 70 without restriction.

When this BPR 70 is in operation, and paint is being used, pressurised air (or other fluid) is not supplied to the chambers 73 and 74. With no air pressure in chamber 73, there is no resistance to the spring force from above, which is transmitted through the posts 81, 85, 86 and moveable members 77, 78 to the element 84 and the main diaphragm 93. This acts against the pressure of paint, tending to constrict the flow path 95 to maintain the upstream paint pressure. In this configuration, the BPR 70 acts in the same way as the BPR 10 of FIG. 2, and the pressure of paint upstream of BPR 70 will be maintained at, or close to, the set point.

As with the BPR 10, the pressure in the system is determined by the applied spring force, which is relayed to the element 84. Accordingly, the screw 72 can be used to adjust the set system paint pressure. This is usually set to provide a conveniently high system pressure as is suitable for when the paint is in use.

However, the advantage of this BPR 70 is that supplying appropriate air pressure to the chambers 73 and 74 can effectively turn off the high pressure force of spring 71. Thus, air pressure in these chambers 73 and 74 will act to push the diaphragms 79 and 80 upwardly so that air can move underneath the moveable members 77 and 78 to act on the surfaces 75 and 76. This will counteract the downward pressure on the plates 82 and 83 forcing them in an upward direction. As the moveable members 77 and 78 move upwards under air pressure, the third post 86 is lifted away from the element 84, allowing it to move freely. Consequently the element 84 will provide no downward force on the main diaphragm 93 so that paint will flow through the BPR 70 without restriction. This mode of operation is desirable when the paint is not in use and it is necessary simply to circulate the paint at a minimum velocity to prevent the pigments from separating from the carrier fluid.

Although, the on-off function, as described above, is the primary reason for supplying air pressure to the BPR 70, it is also possible to use this set-up to remotely vary the force from the spring 71. Thus without adjusting the screw 72, air pressure can be supplied to either one or both air chambers 73, 74 to vary the force acting down on the element 84. A relatively low air pressure will marginally reduce the force of the spring 71 on the element 84 while a relatively high air pressure will greatly reduce the force of the spring 71 on the element 84. As such, a constant air pressure can be supplied to set the desired system pressure.

The BPR 70 is constructed from a bell-shaped portion 101 which surrounds the spring 71. Separate housing portions 88, 92, surround the respective air chambers 73 and 74. A body portion 98 includes a structure 94 for defining the flow path between an inlet port 96 and an outlet port 97. These portions can be assembled in a modular fashion such that any number of housing portions 88, 92, and therefore air chambers 73, 74, can be included. Aligned bolt holes in the housings provide channels 99 through which tie-bolts (not shown) can be inserted to clamp the modular components together. As with the BPR 50 of FIG. 3, air vents 102, 103, 104 are provided respectively in the bell portion 101 and the housing portions 88, 92 to allow ambient air surrounding the plates 82, 83 and the element 84 to flow into and out of respective surrounding cavities 105, 106 and 100 as they move.

As with the BPR 50 of FIG. 3, operation of the BPR 70 can be controlled remotely by a computer.

The present invention enables an operator to automatically pressurise or depressurise a paint circulation system in accordance with the needs at the applicator. Thus, the BPR can be automatically charged to supply line pressure or discharged to reduce line pressure. This ability provides great savings with regards to energy usage and system component wear.

The invention claimed is:

1. A paint circulating system back pressure regulator comprising:
    a paint flow passage at least partially disposed between a fixed structure and a moveable structure, wherein the moveable structure is moveable to vary a width of the paint flow passage to regulate a pressure of paint upstream of the regulator while paint flows through the paint flow passage, and the moveable structure comprises a rigid structure coupled to a first flexible membrane that opens and closes against a surface of the fixed structure, wherein a surface of the first flexible membrane contacts the fixed structure when the moveable structure closes against the surface of the fixed structure;
    a chamber having an opening configured to communicate with a supply of pressurized fluid, wherein the regulator is configured to vary a fluid pressure of the pressurized fluid to control an adjustable set point of the pressure of paint upstream of the regulator; and
    a plurality of independent moveable structures each located in a separate chamber of a plurality of separate chambers, wherein each respective separate chamber of the plurality of separate chambers is configured to be independently pressurized by the supply of pressurized fluid to move one of the plurality of independent moveable structures.

2. The paint circulating system back pressure regulator as claimed in claim 1, wherein the pressurized fluid is compressed air.

3. The paint circulating system back pressure regulator as claimed in claim 1, comprising a biasing member configured to restrict the paint flow passage against the pressure of paint in the paint flow passage when the pressurized fluid is not applied to the chamber.

4. The paint circulating system back pressure regulator as claimed in claim 3, wherein the biasing member is a coiled spring.

5. The paint circulating system back pressure regulator as claimed in claim 3, wherein the biasing member is of adjustable strength.

6. The paint circulating system back pressure regulator as claimed in claim 4, wherein the coiled spring biases the moveable structure toward a closed position to restrict the paint flow passage, and the chamber is pressurized by the supply of pressurized fluid to bias the moveable structure against the coiled spring and toward an open position to open the paint flow passage.

7. The paint circulating system back pressure regulator as claimed in claim 3, wherein the biasing member is isolated from the paint flow passage.

8. The paint circulating system back pressure regulator as claimed in claim 1, wherein the moveable structure comprises a second flexible membrane coupled to the rigid structure.

9. The paint circulating system back pressure regulator as claimed in claim 1, comprising a coiled spring operable to restrict the paint flow passage against the pressure of paint in the paint flow passage when pressurized fluid is not applied to the plurality of separate chambers.

10. A system, comprising:
    a back pressure regulator, comprising:
        a paint flow passage;
        a fixed structure having a first surface; and
        a moveable assembly, wherein the movable assembly comprises:
            a first independently moveable portion having a first structure coupled to a first membrane; and
            a second independently moveable portion having a second structure coupled to a second membrane, wherein the second independently moveable portion comprises a second surface configured to move against the first surface to close the paint flow passage and move away from the first surface to open the paint flow passage, and the moveable assembly is movable to vary a width of the paint flow passage between the first and second surfaces to regulate a pressure of paint upstream of the back pressure regulator while paint flows through the paint flow passage.

11. The system of claim 10, wherein the back pressure regulator comprises a spring operable to restrict the flow passage against a pressure of paint in the flow passage.

12. The system of claim 11, comprising a spring adjuster configured to adjust a compression of the spring to set the pressure of the paint upstream of the back pressure regulator.

13. The system of claim 10, wherein the first and second independently moveable portions each comprise a shaft and a seal disposed about the shaft.

14. A system, comprising:
    a back pressure regulator, comprising:
        a paint flow passage at least partially disposed between a fixed structure and a first moveable structure, wherein the first moveable structure is movable to vary a width of the paint flow passage to regulate a pressure of paint upstream of the back pressure regulator while paint flows through the paint flow passage;
        a biasing member configured to bias the first moveable structure toward a closed position to close the paint flow passage, wherein the biasing member is isolated from the paint flow passage; and
        first and second chambers configured to communicate with a supply of pressurized fluid, wherein the first chamber comprises a first membrane coupled to a second moveable structure, and the second chamber comprises a second membrane coupled to a third moveable structure, and wherein the back pressure regulator is configured to vary a fluid pressure of the pressurized fluid to control an adjustable set point of the pressure of paint upstream of the back pressure regulator.

15. The system of claim 14, wherein the pressure of the pressurized fluid biases the first moveable structure against the biasing member and toward an open position to open the paint flow passage.

16. The system of claim 14, wherein the biasing member comprises a spring.

17. A paint circulating system back pressure regulator comprising:
    a paint flow passage at least partially disposed between a fixed structure and a moveable structure, wherein the moveable structure is moveable to vary a width of the paint flow passage to regulate a pressure of paint upstream of the regulator while paint flows through the paint flow passage, and the moveable structure comprises a flexible membrane that opens and closes against a surface of the fixed structure;

a chamber having an opening configured to communicate with a supply of pressurized fluid; and a plurality of independent moveable structures located in separate chambers, wherein each separate chamber is configured to be independently pressurized by the supply of pressurized fluid to move one of the independent moveable structures, wherein the regulator is configured to vary a fluid pressure of the pressurized fluid to control an adjustable set point of the pressure of paint upstream of the regulator.

18. The paint circulating system back pressure regulator as claimed in claim 17, comprising a coiled spring operable to restrict the paint flow passage against the pressure of paint in the paint flow passage when pressurized fluid is not applied to the separate chambers.

* * * * *